United States Patent [19]

Field et al.

[11] 4,043,910

[45] Aug. 23, 1977

[54] REMOVAL OF PHOSPHOROUS FROM WASTE WATER

[75] Inventors: John Rodney Field, Hipperholme, near Halifax, England; Kenneth Guthrie Andrew, Dundee, Scotland

[73] Assignee: Allied Colloids Limited, Bradford, England

[21] Appl. No.: 692,607

[22] Filed: June 3, 1976

Related U.S. Application Data

[63] Continuation-in-part of Ser. No. 504,791, Sept. 10, 1974, abandoned.

[51] Int. Cl.$^2$ .............................................. C02B 1/20
[52] U.S. Cl. ........................................ 210/53; 210/54; 210/DIG. 29
[58] Field of Search ............... 210/10, 18, 52–54, 210/DIG. 29; 260/79.3, 80.73; 526/312

[56] References Cited

U.S. PATENT DOCUMENTS

| | | | |
|---|---|---|---|
| 3,171,804 | 3/1965 | Rice | 210/18 |
| 3,453,207 | 7/1969 | Eck et al. | 210/49 |
| 3,472,767 | 10/1969 | Lees | 210/52 |
| 3,488,717 | 1/1970 | Wukasch et al. | 210/53 |
| 3,493,500 | 2/1970 | Volk et al. | 210/54 |
| 3,506,570 | 4/1970 | Wukasch | 210/49 |
| 3,607,738 | 9/1971 | Nelson | 210/18 |
| 3,617,542 | 11/1971 | Boehler | 210/53 |
| 3,658,474 | 4/1972 | Rothwell | 210/54 |
| 3,673,083 | 6/1972 | Sawyer et al. | 210/53 |
| 3,776,892 | 12/1973 | Bleyle | 210/54 |
| 3,847,333 | 7/1975 | Field et al. | 210/54 |
| 3,926,756 | 12/1975 | Restaino | 526/312 |

FOREIGN PATENT DOCUMENTS

| | | | |
|---|---|---|---|
| 1,341,971 | 12/1973 | United Kingdom | 210/10 |
| 1,373,034 | 11/1974 | United Kingdom | 210/54 |

*Primary Examiner*—Thomas G. Wyse
*Assistant Examiner*—Peter A. Hruskoci
*Attorney, Agent, or Firm*—Lawrence Rosen; E. Janet Berry

[57] ABSTRACT

Phosphate is removed from an aqueous medium by adding inorganic coagulant followed by a cationic polyelectrolyte which is a water-soluble quaternary ammonium salt of a high molecular weight copolymer of acrylamide and an alkylaminoalkyl ester of acrylic or methacrylic acid. The process is of particular value in reducing the phosphate content of sewage effluent.

10 Claims, No Drawings

REMOVAL OF PHOSPHOROUS FROM WASTE WATER

This application is a continuation in part of our Application Ser. No. 504,791, filed Sept. 10, 1974, now abandoned.

In the treatment of sewage and other aqueous wastes, (i.e. waste waters) generally two distinct areas of solid/-liquid separation are recognised.

The first of these concerns the removal of solid constituents from the bulk liquid effluent with the object of producing a purified aqueous liquid effluent which may or may not require further purification before discharge or re-use. Examples of this are primary or secondary sedimentation processes, filtration processes and flotation processes.

The solids removed in such processes usually are associated with an appreciable quantity of water but because of their nature and consistency they are classified as sludges. The further dewatering of such sludges may also be by sedimentation, filtration, flotation or centrifugation but constitutes a somewhat different and often more difficult technology which is commonly referred to as sludge dewatering.

Whilst it is true to say that there are certain common features between the two, for instance in relation to the site of operation, nevertheless in practice the overall techniques, handling methods, reagent dosages and reagent types are usually quite different for the two areas.

There is often some confusion in the patent literature concerning these two areas and accordingly it is to be stated that the usage of the present invention is connected with technology of the first area, i.e., bulk effluent treatment and not at all with the second area i.e., sludge dewatering. This will be readily apparent to those skilled in the art.

As a typical example of a conventional sewage treatment, the raw sewage generally undergoes a preliminary treatment for the removal of grit and coarse matter, followed by primary sedimentation, where finer solids are settled out by slow passage through large sedimentation tanks. This primary treatment may be followed by a secondary stage where further purification of the sewage is carried out biologically. As the biological stage creates more insoluble solids, a secondary sedimentation step follows. The sludges from each sedimentation step are then combined and de-watered while the effluent from the final sedimentation step is discharged.

The presence of phosphorus in sewage effluents has been recognised as promoting the growth of algae and aquatic plants in receiving waters by providing a source of nutrition. Excessive plant growth can cause clogging of water courses, and the growth and subsequent death of algae can be responsible for the eutrophication of lakes and other receiving waters.

Whereas it is recognised that other elements, such as carbon and nitrogen, contribute towards the nutritive value of effluents, recent attention has focussed mainly on the removal of phosphorus as being the simplest contributing element to remove.

Phosphorus can be found in sewage in a number of forms, for instance as both soluble and insoluble phosphates or complex phosphates. Thus a typical raw sewage entering a sewage treatment works might contain two thirds of the phosphorus as soluble orthophosphates and polyphosphates and one third as insoluble phosphates. Further, because part of the insoluble phosphates may be present in a colloidally dispersed form, not all of the insoluble phosphates can be removed from the sewage by a sedimentation process.

The object of the present invention is to provide ways of reducing conveniently and satisfactorily the phosphate content of bulk effluent aqueous wastes. The invention is of particular value when utilised to reduce the phosphate content of the effluent from a sewage bulk effluent process, but is also applicable to the treatment of any bulk effluent aqueous waste containing soluble phosphate, for example a trade effluent such as a chemical waste or a food factory waste.

It is known to remove soluble phosphates from sewage by chemical treatment that causes precipitation of the dissolved colloidal phosphates, followed by removal of the precipitated phosphates generally by settlement. Inorganic coagulants suitable for this purpose include certain soluble salts containing multivalent cations, such as aluminium sulphate, ferrous sulphate, ferric sulphate, ferric chloride, sodium aluminate and calcium hydroxide, the use of which result in the phosphates becoming precipitated as the corresponding insoluble metal phosphates.

Unfortunately the settlement is much too slow and ineffective to be accomplished satisfactorily in a normal sewage sedimentation stage and it is already known to improve the settlement by adding polyelectrolyte flocculants. Thus U.S. Pat. No. 3,506,570 teaches the use of trivalent aluminium ions and anionic polyelectrolyte flocculants, being high molecular weigh copolymers of from 80 to 50 weight percent acrylamide or methacrylamide and from about 20 to 50 weight percent acrylic or methacrylic acid or water-soluble salts thereof.

Likewise, U.S. Pat. No. 3,617,569 discloses that the separation of precipitated metal phosphates is facilitated by the use of a water-soluble organic polyelectrolyte flocculating agent such as a partially hydrolysed polyacrylamide. The use is described, in U.S. Pat. No. 3,171,802, of metal salts and anionic or nonionic polyelectrolyte flocculants followed by filtration through coal, sand and activated carbon, for sewage treatment. U.S. Pat. No. 3,655,552 teaches the removal of phosphates by the synergistic admixture of a water-soluble, high molecular weight nonionic polymer, preferably polyacrylamide, and a water-soluble salt containing ferric ions, preferably ferric chloride. Also, U.S. Pat. No. 3,607,738 describes the use of lime and cationic polyamines for phosphate removal during tertiary treatment of sewage, and U.S. Pat. No. 3,453,207 describes the use of alum and a homogeneous latex emulsion comprising water, polybutadiene and a cationic emulsifying agent.

Also of course it is well known to use a variety of flocculants, either by themselves or in combination with other materials, to promote de-watering of sewage sludge. For example one such process is described in U.S. Pat. No. 3,472,767 in which specified cationic copolymers are added to sewage sludge in the presence of polyvalent metal ions to facilitate de-watering of the sludge. This however is not relevant to the problem of reducing the phosphate content of the effluent from a sewage sedimentation process.

A disadvantage of the processes described above for the reduction of phosphate in bulk effluent is that all the described processes tend to be rather slow. For example U.S. Pat. No. 3,506,570 suggests that a time of at least 2 minutes and preferably 5 minutes should elapse between the addition of coagulent and flocculant while U.S. Pat. No. 3,453,207 suggests periods of 5 to 30 minutes with agitation as being required. It would be desirable to be able to obtain good results by adding the flocculant much more quickly after the coagulant and quickly thereafter passing the mixture to the sedimentation stage. Thus in many sewage works now there is a relatively high speed of flow such that the time between the raw sewage entering the works and reaching the primary sedimentation tank may be less than 5 minutes. Similarly after biological treatment of the effluent from the first step insufficient time may be available before the secondary sedimentation step to allow adequate precipitation by known processes.

According to our invention we remove phosphate from an aqueous waste bulk effluent containing phosphate by precipitating soluble and colloidal phosphates in the medium by adding to the medium an inorganic coagulant, and thereafter we add to the medium certain water soluble high molecular weight cationic polyelectrolyte flocculants, and then we subject the waste to a liquids-solids separation process.

The high molecular weight cationic polyelectrolyte flocculants used in the invention are water soluble quaternary ammonium salts of particular copolymers containing (a) units of alkylaminoalkyl esters of methacrylic or, preferably, acrylic acid and (b) acrylamide units.

The addition of the cationic polyelectrolyte appears to result in assisting and accelerating flocculation and sedimentation of the precipitated phosphates. Whatever the mechanism, by the invention it is possible to achieve phosphate removal from sewage very quickly and to a greater degree than by previous methods. The method has the advantage that a wide variety of metal salts can be used for precipitation of the phosphorus compound and it generally requires no elaborate agitation means. This method usually also results in good reductions in other pollution parameters, such as suspended solids content and Biochemical Oxygen Demand and generally can be applied at any part of a sewage purification process immediately prior to a sedimentation stage.

As the inorganic coagulant, metal salts such as those mentioned above can be used. In general the salt is a water soluble compound, usually an acid salt, containing a multivalent metal cation and in particular is usually one of the compounds that is often used in waste water treatment, examples being compounds of $Al^{3+}$, $Fe^{2+}$, $Fe^{3+}$ and $Ca^{++}$, e.g. aluminium sulphate, sodium aluminate, ferrous sulphate, ferric sulphate, ferric chloride and calcium hydroxide.

The copolymers consist essentially of the following groups:

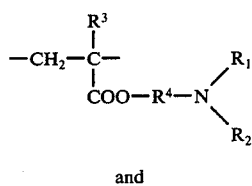

(a)

and

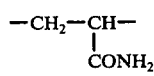

(b)

in which $R_1$ and $R_2$ may be the same or different and are hydrogen or alkyl or, together with the nitrogen atom to which they are attached, form a heterocyclic ring, $R^4$ is alkylene containing 1 to 8, usually 2 to 4, carbon atoms and $R^3$ is methyl or, preferably, hydrogen. If $R_1$ and $R_2$ form a heterocyclic radical they preferably represent an alkylene chain of 4 to 6 carbon atoms. Alkyl groups represented by $R_1$ and $R_2$ usually contain no more than 8 carbon atoms, preferably 1 to 4 carbon atoms, preferably methyl or ethyl. $R^4$ preferably contains 2 carbon atoms (ethylene). Preferred copolymers are quaternary ammonium salts, and especially such salts where $R_1$ and $R_2$ contain 1 or 2 carbon atoms each. Preferred quaternising reagents are those that introduce the alkyl group, for example $C_{1-4}$ alkyl (especially methyl or ethyl), onto the nitrogen atom. Thus typical quaternising reagents are dimethyl sulphate and methyl chloride.

The preferred copolymers have $R^4$ representing $C_2H_4$, $R_1$ and $R_2$ being the same of different and representing methyl or ethyl and which are quaternised with dimethyl sulphate.

The copolymers must contain from 80 to 97 mole per cent (b), (i.e. a molar ratio of (a) : (b) of approximately of 1:4 to 1:33) and the most preferred copolymers generally contain from 85 to 97 mole percent, especially 85 to 93 mole percent, b (i.e. molar ratios of approximately 1:6 to 1:33 or 1:6 to 1:12). All mole percentages are based on a plus b.

Generally the copolymer consists solely of the two specified types of groups but of course smaller amounts of other vinyl groups may be included in the copolymers. As these other vinyl groups, there may be used any vinyl monomers that can copolymerise with the other vinyl monomers that are specified and that do not interfere deleteriously with the properties of the copolymer. Such vinyl monomers may be selected from all the conventional vinyl monomers. The amount is usually below 20 mole percent preferably below 10 mole percent.

We prefer to specify the molecular weight of the polyelectrolytes we use in this invention in terms of the viscosity of their solutions. The copolymers should be such that at 25° C the viscosity in centipoise of their aqueous solutions at pH 6.0, containing 1% by weight of the polymer, and in the absence of added salts, using a Brookfield Model RVT viscometer with spindle No. 3 and at 20 rpm is greater than 2000. A viscosity greater than 3000 is especially preferred.

Suitable copolymers are well known and are commercially available. They can be made in any convenient manner, for example by well known vinyl type polymerisation methods including, for example, free radical initiated solution polymerisation.

The aqueous medium to which the additions are made may be a trade effluent, such as a chemical effluent or preferably a food factory waste, but preferably is raw sewage or the effluent from a primary or secondary sedimentation stage. The sludge resulting from the process when the aqueous medium is raw sewage or a sedimentation effluent may be subjected to de-watering by any suitable method.

The process is conveniently carried out by adding the metal salt or other inorganic coagulant in an amount such that the metal cation : phosphate molar ratio is at least 1:1, preferably about 2:1. Naturally it is necessary that the metal cation becomes mixed rapidly through the aqueous medium but this is conveniently achieved by adding the metal cation to a flowing stream of the medium. The pH of the stream is preferably such as to promote precipitation of insoluble phosphate. It is important that the polyelectrolyte is added after the coagulant but it is desirable that it should not be added too long after the coagulant. Thus it should be added within 5 minutes of adding the coagulant and as shown in the Examples it is best to add it within 4, and preferably within 2 minutes. Most preferably it is added less than a minute after adding the coagulant. There must be a definite time interval between adding the coagulant and the flocculant, preferably at least 15 seconds. A preferred interval is a quarter of a minute to 1 minute. Naturally it is necessary that the flocculant shall mix rapidly through the aqueous medium: conveniently this is achieved by adding it to a flowing stream of the medium. The amount of polyelectrolyte added is generally from 0.1 to 2 or perhaps 3 mg/l, preferably about 0.5 to 1 mg/l. It is generally introduced in the form of a dilute aqueous solution having a concentration of from 0.01 to 0.05 percent by weight.

After adding the polyelectrolyte the aqueous waste is subjected to a liquid-solids separation process, such as sedimentation and/or filtration and/or centrifugation to separate the solids from the liquid.

The invention is illustrated by the following Examples.

EXAMPLE 1

To 200 ml aliquots of a raw sewage, obtained before primary sedimentation, aluminium sulphate was added in various amounts as a 5% weight by volume solution of $Al_2(SO_4)_3.16H_2O$, with stirring at 160 rpm.

After 30 seconds, various polyelectrolyte flocculants were added at a dose of 1 mg/l, with further stirring at 160 rpm for 30 seconds, followed by stirring at 40 rpm for 1 minute and stirring at 5 rpm for 3 minutes.

The polyelectrolytes added were:

1. An anionic polyelectrolyte, being a copolymer of about 60% by weight acrylamide and about 40% by weight sodium acrylate, that is, about 66 mole percent acrylamide and about 54 mole percent sodium acrylate.

2. An anionic polyelectrolyte as No. 1, but with about 10% sodium acrylate, that is, about 92 mole percent acrylamide and about 8 mole percent sodium acrylate.

3. A cationic polyelectrolyte, being a copolymer of about 90% by weight acrylamide and about 10% by weight of dimethyl sulphate quaternised diethylamino ethyl acrylate, that is, about 97 mole percent acrylamide and about 3 mole percent quaternised diethylaminoethylacrylate.

4. A cationic polyelectrolyte as No. 3, but with about 70% acrylamide, that is, about 90 mole percent acrylamide and about 10 mole percent quaternised diethylaminoethylacrylate.

5. A nonionic polyelectrolyte, being a homopolymer of acrylamide.

Polyelectrolytes Nos. 3 and 4 had viscosities as previously described of 2140 cp and 3370 cp respectively.

Analyses were made to determine the total phosphorus contents of the supernatant liquors produced after treatment of the sewage with aluminium sulphate and the above polymers, resulting in the following data. Results are given as mg/l phosphorus and the initial total phosphorus content of the sewage was 14 mg/l. Aluminium sulphate doses are given as mg/l $Al_2(SO_4)_3.16H_2O$.

| Polymer | Supernatat total phosphorus content (mg/l) for aluminium sulphate doses of | | | |
|---|---|---|---|---|
| | 100 mg/l | 200 mg/l | 300 mg/l | 400 mg/l |
| None | 9.8 | 7.6 | 5.9 | 2.2 |
| No. 1 | 7.2 | 4.5 | 2.3 | 1.1 |
| No. 2 | 7.5 | 4.9 | 2.6 | 1.3 |
| No. 3 | 6.0 | 2.4 | 0.6 | 0.5 |
| No. 4 | 5.2 | 2.0 | 0.4 | 0.3 |
| No. 5 | 9.8 | 7.2 | 4.9 | 1.9 |

The results show that while increased phosphate removal results from the use of the anionic polyelectrolytes compared with the aluminium sulphate alone, much better results are possible with the cationic polymers, particularly No. 4. The nonionic polyelectrolyte, No. 5, gave almost no improvement over aluminium sulphate alone.

Similarly, good results can also be obtained if other quaternary or other salts of polymer 4 are used or if polymers similar to polymer 4 are used but in which either or both $R_1$ and $R_2$ are replaced by methyl.

EXAMPLE II

A similar series of tests was carried out with a sample of sewage obtained just before secondary settlement, that is, after the raw sewage had undergone primary sedimentation and biological purification in bacteria filters, but before settlement for removal of solids produced by the biological purification.

A 10% slurry of calcium hydroxide was added at various doses for the precipitation of the phosphates and the polyelectrolytes of Example 1 were added at a dose of 1 mg/l.

The total phosphorous content of the sample was initially 7.4 mg/l and the following results were obtained.

| Polymer | Supernatant total phosphorus content (mg/l) for calcium hydroxide dose of | | |
|---|---|---|---|
| | 100 mg/l | 200 mg/l | 300 mg/l |
| None | 5.5 | 1.8 | 0.4 |
| No. 1 | 4.1 | 0.9 | 0.3 |
| No. 2 | 3.6 | 0.8 | 0.3 |
| No. 3 | 2.4 | 0.6 | 0.1 |
| No. 4 | 1.9 | 0.3 | 0.07 |
| No. 5 | 4.6 | 1.3 | 0.3 |

As with Example 1, the results show that, while the nonionic polymer, No. 5, gives only slight improvement and the anionic polymers Nos. 1 and 2 give fairly good improvements in phosphate removal, very superior results are obtained with the cationic polymers, Nos. 3 and 4, again particularly No. 4.

EXAMPLE III

This example illustrates processes in which the coagulant and flocculant are added to the effluent going to a tertiary sedimentation process involving settlement or filtration. Such processes are desirable where it is necessary to remove residual suspended solid in the effluent from a secondary sedimentation stage or where it is considered advantageous to remove nutrients after the conventional sedimentation process is complete.

For this example, a series of jar tests was carried out by the procedure described above for Examples I and II on effluent following a secondary sedimentation process.

Aluminium sulphate was added at two doses for the precipitation of the phosphate and the polyelectrolytes of Example I were added subsequently at 0.5 mg/l.

| Polymer | Supernatant total phosphorous content (mg/l) for Aluminium Sulphate Dosage | |
|---|---|---|
| | 120 mg/l | 150 mg/l |
| None | 1.02 | 0.61 |
| No. 1 | 0.64 | 0.55 |
| No. 2 | 0.64 | 0.54 |
| No. 3 | 0.52 | 0.35 |
| No. 4 | 0.40 | 0.20 |
| No. 5 | 0.71 | 0.70 |

These results show that while all polyelectrolyte treatment give better results than aluminium sulphate alone the best results are obtained in accordance with the invention, using copolymers 3 and 4, especially 4.

EXAMPLE IV

A series of tests was carried out by a similar procedure to that of Examples I and II, to investigate the effect of varying the time between addition of the metal salt and addition of the polyelectrolyte, which we call the intervening mixing time. A sample of raw sewage was used, with a total phosphorus content of 12.0 mg/l. The metal salt used was aluminium sulphate, and a constant amount of 150 mg/l $Al_2(SO_4)_3 \cdot 16H_2O$ was added in each case.

The polyelectrolyte flocculants, No. 1 and No. 4 from Example 1, were added at a dose of 0.5 mg/l, producing the following results.

| Intervening Mixing Time (minutes) | Supernatant phosphorus content (mg/l) | |
|---|---|---|
| | Flocculant No. 1. | Flocculant No. 4. |
| 0 | 10.4 | 6.4 |
| 0.25 | 9.0 | 0.43 |
| 0.5 | 4.1 | 0.43 |
| 1 | 0.96 | 0.45 |
| 2 | 0.74 | |
| 3 | 0.75 | |
| 4 | 0.83 | 0.59 |
| 5 | 1.0 | 0.73 |

The results illustrate an important benefit of our invention, namely that a very short intervening mixing time, often a minute or even half a minute or less, is sufficient and that in fact the degree of suspended solids increases if mixing is conducted for as long as has often been necessary in the past.

This benefit means that the process of our invention can be readily applied to existing sewage works where longer intervening mixing times are not possible without substantial alterations involving high capital outlay. Such a situation would occur where phosphate removal was to be carried out before the primary sedimentation stage and, due to the speed of flow of the sewage, only a short time would elapse between entry of the raw sewage to the works and its entry to the primary sedimentation tanks. Also, where a new works is planned to incorporate phosphate removal by chemical treatment, this feature of our invention means that extra land need not be taken up in order to ensure long periods of flow of sewage between addition of metal salt and polyelectrolyte.

EXAMPLE V

The data presented in this example are obtained from results on the plant scale at a sewage treatment works. At this works, the raw sewage stream is divided into two parts which then pass separately through different primary sedimentation tanks.

A trial was carried out to assess the process of our invention by treating one part of the flow and making a comparison with the other, untreated part.

To one part of the flow, ferric sulphate was added as a 62.5% weight by volume solution, followed by addition of a high molecular weight cationic polyelectrolyte of type No. 4 of the previous examples. The time taken for the sewage to flow between the two additon points was approximately 20 seconds. Mixing of the chemicals with the sewage was simply effected by placing a wooden baffle across the channel at each addition point to provide the necessary turbulence.

Samples were taken of the sewage at various stages and the total phosphorous content was measured. In the table below Sample A is raw sewage entering the plant. Sample B is the sewage effluent leaving the sedimentation tanks when no coagulant or flocculant is added. Sample C is the sewage effluent leaving the sedimentation tanks when ferric sulphate and polyelectrolyte were added to the sewage leading to the sedimentation tanks in the manner described above.

Addition of ferric sulphate and polyelectrolyte was carried out only during the period of meximum flow, which was for about 8 hours per day, but analyses were made on composite samples obtained over 24 hour periods. As these composite samples will therefore contain some sewage which had not been chemically treated and as the perforance of the sedimentation tanks is subject to adverse effects from the build-up of sludge, a further series of samples was taken. These samples, D, were obtained from the chemically treated sewage before entry to the sedimentation tanks to assess the performance of the invention under optimum conditions. The samples were allowed to settle for 5 minutes, and analysis was made of the total phosphorus content of the supernatant liquid.

The average results and the range of results obtained over a period of 6 months are shown below.

Average ferric sulphate dose = 238 mg/l $Fe_2(SO_4)_3$.
Average polyelectrolyte dose = 0.5 mg/l.

| Sample | Average Total phosphorus content (mg/l) | Range (mg/l) | Average Phosphorus Removal (%) | Range (%) |
|---|---|---|---|---|
| A | 5.2 | 3.7 - 7.9 | — | — |
| B | 3.8 | 2.5 - 5.1 | 29.8 | 17.2 - 51.5 |
| C | 0.57 | 0.04 - 2.0 | 90.0 | 72.1 - 99.0 |
| D | 0.05 | 0.00 - 0.26 | 99.2 | 96.7 - 99.9 |

Comparison of the results of samples B and C illustrates the effectiveness of the process of our invention on a plant scale. Although the composite samples C contain some sewage to which the chemical additions had not been made, a high average removal of phosphates resulted. The results of samples D show that, under optimum conditions, virtually complete removal of phosphates is possible.

Further analysis of the above samples showed that compared with the untreated part of the sewage after sedimentation, i.e. samples B, the treated part of the sewage after sedimentation, samples C, had a suspended solids content lower by 66% and a biochemical oxygen demand lower by 55%.

The foregoing Examples all demonstrate the application of the invention to aqueous wastes which are raw sewage or effluent from sedimentation stages of sewage. The treatment of such aqueous wastes represents an important application of the invention both because of the very good results that are obtained on such aqueous wastes and for economic reasons. However the invention is also applicable to any other aqueous waste containing phosphate and is not restricted solely to a treatment of raw sewage or the effluent from sewage sedimentation stages. Any attempt to list particular effluents that can be treated successfully in accordance with the invention must necessarily be rather arbitrary since there are so many that can be treated successfully in the invention. Broadly useful effluents will come under the heading trade effluents. These may be chemical effluents or they may be effluents such as the effluents from food factories. Food factory effluents are of course often a component of raw sewage.

The results obtainable when treating some of these effluents may not appear to give quite such a dramatic improvement as some of the results in the foregoing Examples, but in fact they do give a very valuable and commercially important improvement. The following are two Examples where food factory waste was subjected to a treatment substantially as described in Example 1.

EXAMPLE 6

The effluent from a food processing factory containing 15 mg/liter of phosphorus was subjected to the following procedure. A 10% solution of ferric sulphate was added to the stirred effluent at a dosage of 400 mg/liter. After an intervening mixing time of 30 seconds Flocculants No. 1 or No. 4 were added at a dosage of 3 mg/liter. The supernatant phosphorus content was reduced by 26% when Flocculant No. 4 was used and by 14% when the prior art Flocculant No. 1 was used.

EXAMPLE 7

The procedure of Example 6 was repeated except that calcium hydroxide was added instead of ferric sulphate at a dosage of 80 mg/liter and with an intervening mixing time of 15 seconds.

Using Flocculant No. 1 the supernatant phosphorus content was reduced to 4.3 mg/liter and with Flocculant No. 4 the phosphorus content was reduced to 3.4 mg/liter.

Although the reductions are smaller than those obtained with sewage effluents, these results show that a significant improvement is obtained using the process of the invention. Trade effluents are known to be more difficult to treat because of the presence of stabilising compounds.

We claim:

1. A process for removing phosphate from aqueous waste selected from the group consisting of raw sewage, an effluent from a primary or secondary sewage sedimentation process, and a food processing factory effluent containing phosphate comprising the steps of, in order, (1) precipitating soluble and colloidal phosphate in the waste by adding a sufficient amount of an inorganic coagulant containing a multivalent metal cation selected from the group consisting of aluminum, ferrous, ferric and calcium to the waste to precipitate soluble and colloidal phosphate therefrom, (2) adding to the waste after an interval of about 15 seconds to 4 minutes a sufficient amount of a cationic polyelectrolyte which is quaternary ammonium salt of a copolymer, having a molecular weight such that at 25° C the viscosity in centipose of an aqueous solution have a pH of 6.0, containing 1% by weight of the polymer and in the absence of added salts using a Brookfield Model RVT viscometer with spindle No. 3 at 20 rpm is greater than 2000, and consisting essentially of units of

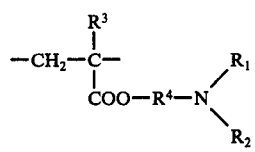

(a)

and

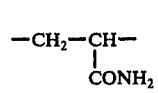

(b)

in which $R_1$ and $R_2$ may be the same or different and are selected from the group consisting of hydrogen and alkyl, $R^4$ is alkylene containing 1 to 8 carbon atoms and $R^3$ is hydrogen and in which (b) is present in an amount of 80 to 97 mole % based on (a) plus (b) to flocculate the precipitated phosphate, and (3) subjecting the waste to a liquid-solids separation process.

2. A process according to claim 1 in which the aqueous waste is raw sewage.

3. A process according to claim 1 in which the effluent is an effluent from a primary or secondary sewage sedimentation process.

4. A process according to claim 1 in which $R_1$ and $R_2$ are methyl or ethyl and $R^4$ is ethylene.

5. A process according to claim 1 in which the copolymer is a quaternary ammonium salt with dimethyl sulphate or methyl chloride.

6. A process according to claim 1 in which the copolymer contains from 85 to 97 mole % (b) based on (a) plus (b).

7. A process according to claim 1 in which the polyelectrolyte is added less than 1 minute after the coagulant.

8. A process according to claim 1 wherein the metal cation to phosphate molar ratio is at least 1 to 1.

9. A process according to claim 1 wherein the amount of polyelectrolyte ranges from about 0.1 to 3 mg/l.

10. A process according to claim 1 in which the aqueous waste is food processing factory effluent.

* * * * *